United States Patent
Lemley et al.

(10) Patent No.: US 11,423,567 B2
(45) Date of Patent: Aug. 23, 2022

(54) METHOD AND SYSTEM TO DETERMINE THE LOCATION AND/OR ORIENTATION OF A HEAD

(71) Applicant: FotoNation Limited, Galway (IE)

(72) Inventors: Joe Lemley, Galway (IE); Peter Corcoran, Galway (IE)

(73) Assignee: FotoNation Limited, Galway (IE)

( * ) Notice: Subject to any disclaimer, the term of this patent is extended or adjusted under 35 U.S.C. 154(b) by 58 days.

(21) Appl. No.: 16/904,029

(22) Filed: Jun. 17, 2020

(65) Prior Publication Data

US 2021/0398313 A1 Dec. 23, 2021

(51) Int. Cl.
 *G06T 7/73* (2017.01)
 *G06T 7/593* (2017.01)
 *G06V 40/16* (2022.01)

(52) U.S. Cl.
 CPC ............... *G06T 7/73* (2017.01); *G06T 7/593* (2017.01); *G06V 40/165* (2022.01); *G06V 40/176* (2022.01); *G06T 2207/10012* (2013.01); *G06T 2207/10044* (2013.01); *G06T 2207/20084* (2013.01); *G06T 2207/30201* (2013.01); *G06T 2207/30268* (2013.01)

(58) Field of Classification Search
 CPC . G06T 7/73; G06T 7/593; G06T 2207/10012; G06T 2207/10044; G06T 2207/20084; G06T 2207/30201; G06T 2207/30268; G06K 9/00248; G06K 9/00315
 See application file for complete search history.

(56) References Cited

U.S. PATENT DOCUMENTS

| 6,422,595 B1 * | 7/2002 | Breed ................... B60N 2/002 280/735 |
| 2007/0183651 A1 * | 8/2007 | Comaniciu ............... G06T 7/74 382/154 |
| 2014/0160123 A1 | 6/2014 | Yang et al. |

(Continued)

FOREIGN PATENT DOCUMENTS

| EP | 3440833 B1 | 8/2019 |
| WO | 2016091545 A1 | 6/2016 |
| WO | 2019042703 A1 | 3/2019 |

(Continued)

OTHER PUBLICATIONS

European Patent Office—International Searching Authority, International Search Report and Written Opinion of PCT Application No. PCT/EP2021/063926 dated Aug. 26, 2021, 14 pages.

(Continued)

*Primary Examiner* — Phuoc Tran
(74) *Attorney, Agent, or Firm* — Lee & Hayes, P.C.

(57) ABSTRACT

A method for determining an absolute depth map to monitor the location and pose of a head (100) being imaged by a camera comprises: acquiring (20) an image from the camera (110) including a head with a facial region; determining (23) at least one distance from the camera (110) to a facial feature of the facial region using a distance measuring sub-system (120); determining (24) a relative depth map of facial features within the facial region; and combining (25) the relative depth map with the at least one distance to form an absolute depth map for the facial region.

14 Claims, 7 Drawing Sheets

(56) References Cited

U.S. PATENT DOCUMENTS

2015/0055085 A1 2/2015 Fonte et al.
2018/0025240 A1* 1/2018 Klement .............. H04N 13/239
                                                                    348/47

FOREIGN PATENT DOCUMENTS

| WO | 2019145516 A1 | 8/2019 |
| WO | 2019145578 A1 | 8/2019 |
| WO | 2019180033 A1 | 9/2019 |

OTHER PUBLICATIONS

J. S. Pointer, "The interpupillary distance in adult Caucasian subjects, with reference to 'readymade' reading spectacle centration" in Ophthalmic Physiol. Opt., 2012, pp. 324-331.

M. Zollhöfer et al., "State of the art on monocular 3D face reconstruction, tracking, and applications", Comput. Graph. Forum, 2018, vol. 37 (2018), No. 2, Published by John Wiley & Sons Ltd., 28 pages.

Posch, C, Serrano-Gotarredona, T., Linares-Barranco, B., & Delbruck, T. "Retinomorphic event-based vision sensors bioinspired cameras with spiking output", Proceedings of the IEEE, 102(10), 1470-1484, (2014).

Y. Guo et al., "CNN-Based Real-Time Dense Face Reconstruction with Inverse-Rendered Photo-Realistic Face Images", IEEE Trans. Pattern Anal. Mach. Intell., arXiv:1708.00980v3 [cs.CV] May 15, 2018, pp. 1-16.

L. Jiang et al., "3D Face Reconstruction with Geometry Details from a Single Image", IEEE Trans. Image Process., arXiv:1702.05619v2 [cs.CV] Jun. 11, 2018, pp. 1-14.

P. Garrido et al., "Reconstruction of personalized 3D face rigs from monocular video", ACM Trans. Graph., 2016. pp. 1-15.

K.He et al., "Deep residual learning for image recognition", in Proceedings of the IEEE conference on computer vision and pattern recognition, 2016, pp. 770-778.

Elrasad, et al.: "Object Detection for Event Cameras", U.S. Appl. No. 16/904,122, filed Jun. 17, 2020.

* cited by examiner

METHOD AND SYSTEM TO DETERMINE THE LOCATION AND/OR ORIENTATION OF A HEAD

FIELD

The present invention relates to a method and system to determine the location and/or orientation of a head, for example, a head of a driver of a vehicle.

BACKGROUND

A number of applications including driver monitoring systems, DMS, are concerned with determining a location and orientation for a head being imaged by a camera. In a DMS, this information can be used to assist in safety-critical systems such as intelligent air-bag deployment.

Known DMS systems are already quite sophisticated in determining the head-pose from a near infra-red (NIR) camera using advanced image analysis and deep learning techniques.

Some such systems can use anthropometric data, such as estimated eye separation distance, for a region of interest comprising a face being tracked for example, as disclosed in PCT Application WO 2016/091545 (Ref: FN-399), to determine a distance to the face.

It is however challenging to provide an accurate distance in this manner because of the variability of human anatomical features. J. S. Pointer, "*The interpupillary distance in adult Caucasian subjects, with reference to 'readymade' reading spectacle centration*" in *Ophthalmic Physiol. Opt.*, 2012 discloses that the spacing of the eyes for each individual can vary quite significantly, ranging from 55 mm to 75 mm. This variation introduces a depth scale ambiguity. Therefore, even with a large data sample that is representative of many people, is can be challenging to achieve an overall accuracy in absolute depth measurement of less than +/−5% variations.

Relative depth, that is the depth of the face relative to one or more points on the face, does not have this depth scale ambiguity problem. A relative depth map of a face can be accurately calculated in several ways from image data of a face. For example, M. Zollhöfer et al., "*State of the art on monocular 3D face reconstruction, tracking, and applications*", *Comput. Graph. Forum*, 2018 discloses determining a 3D geometric shape of a head based on a sequence of 2D multi-view images of the head. A relative depth map may then be determined from the determined 3D geometric shape, the determined relative depth map being relative to the absolute dimensions of the subject's head. The determined relative depth map can be converted into an absolute depth map by comparision of anatomical feature dimensions to expected values. However, such a conversion will introduce a +/−5% error due to the above-mentioned variability of anatomical features. All individual pixels of the resultant absolute depth map will therefore exhibit a potential error of +/−5%. Given there is a distance of about 1 meter between the DMS and the subject this translates into a potential variation of +/−5 cm in the accuracy of an absolute depth map.

As such an error in the absolute depth map arises due to the inherent variability among humans, it is not possible to address this by increasing the size of the dataset of human head images. There will always be cases where a person with wide-set eyes in a broad face will be determined to be closer to the camera that they actually are; and correspondingly, a person with a narrow face and narrow-set eyes will be determined to be further from the camera than they actually are.

The present invention addresses at least some of the deficiencies in this known systems.

SUMMARY OF THE INVENTION

The present invention is defined by the independent claims. Further optional features are defined in the dependent claims.

The present invention relates to a method and system for producing an absolute depth map for a facial region being imaged by a camera, allowing the position and/or pose of the head relative to the camera to be determined and used for subsequent applications.

Embodiments can be employed in driver monitoring systems where the head comprises a driver of a vehicle and where the position and/or pose can be determined in real-time. An absolute depth measurement is used to enable accurate conversion of relative depth measurements determined from real-time analysis of image data from a user-facing camera.

Embodiments include a distance sensing sub-system which may comprise at least one of a short-range radar element, an ultrasonic distance measuring element, and a non-visible wavelength laser distance measuring element. Additionally or alternatively, the distance sensing sub-system may comprise a stereo camera formed from a user-facing camera and an additional offset user-facing camera.

Embodiments can be implemented in a system adapted to receive information relating to the image data from a user-facing camera and the at least one depth measurement, and to produce real-time images that report the position and pose of the head of a driver of a vehicle.

By using the method or system of the present invention, an error rate of <1% for individual pixels of an absolute depth map is achieved.

BRIEF DESCRIPTION OF THE DRAWINGS

Embodiments of the invention will now be described, by way of example, with reference to the accompanying drawings, in which.

DESCRIPTION OF THE EMBODIMENT

Embodiments of the present invention will now be described by reference to the above-referenced figures.

Figure 1:
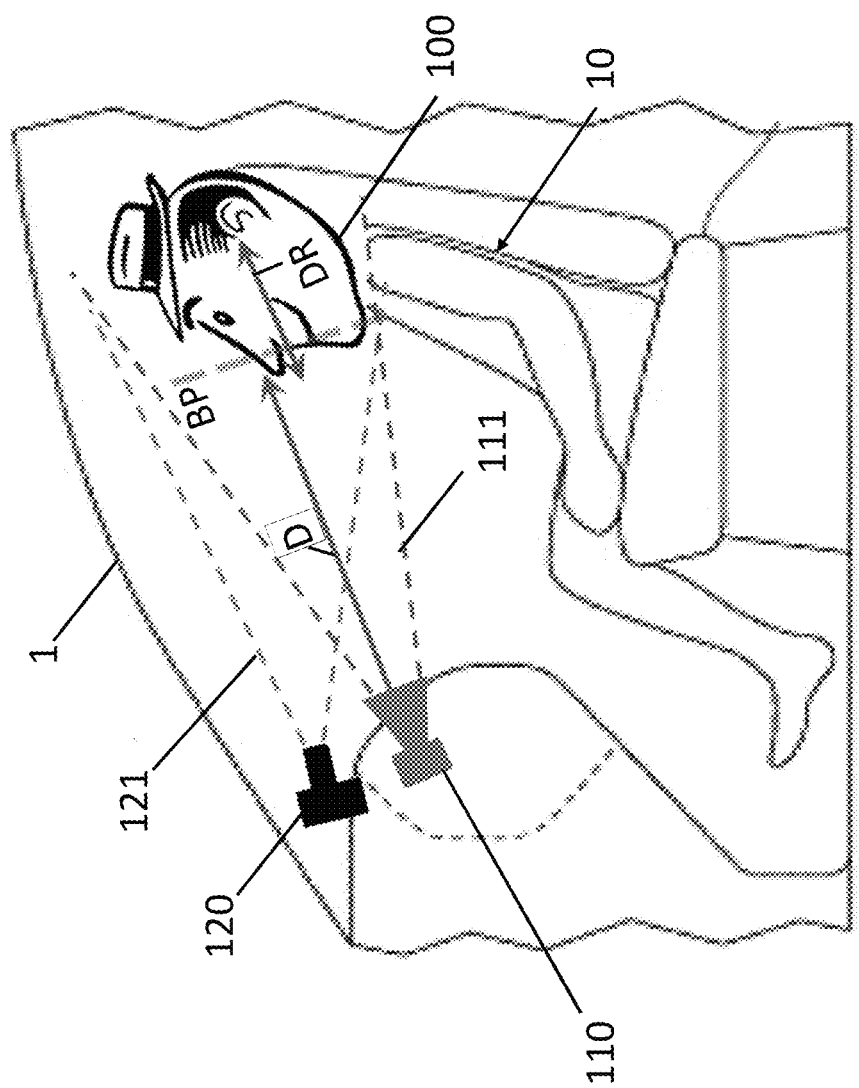
FIG. 1 shows a driver together with a driver monitoring system, DMS, and a distance measurement sub-system.
Figure 2:
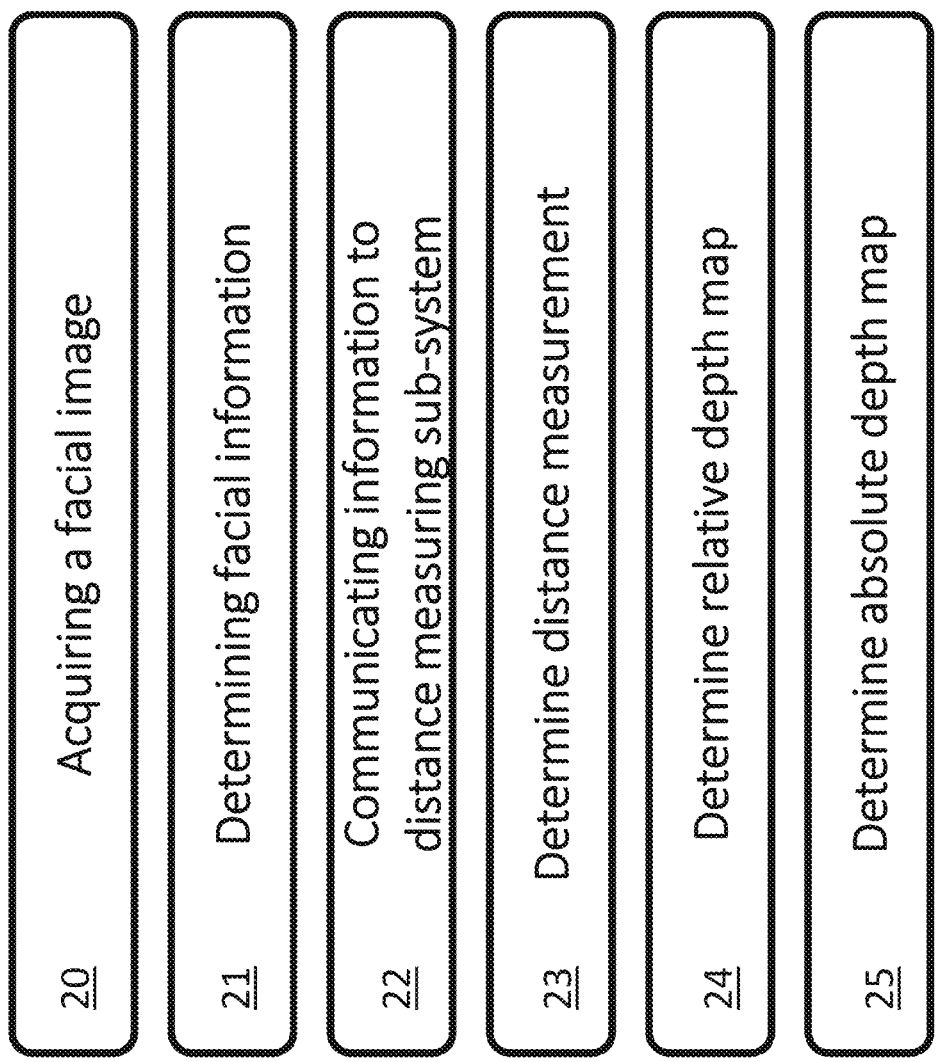
FIG. 2 shows a flow diagram demonstrating a process according to an embodiment of the present invention.

In FIG. 1, a driver 10 is situated inside a compartment of a vehicle 1. The head 100 of the driver 10 is monitored by driver monitoring system, DMS. The DMS comprises a user-facing camera 110 which is configured so that the head 100 of the user is within the field of view 111 of the user-facing camera 110. In the embodiment shown in FIG. 1, the user is the driver 10 of the vehicle 1 and thus the user-facing camera is a driver-facing camera. It is also possible in DMS systems for the camera to capture images of one or passengers within the field of view and to process these as described below. The methods and systems described below are not however limited to vehicular applications and may be used in any situation where it is useful to track the absolute location and pose of a head of a user.

The position of the head 100 may be characterized by a base plane BP, which is separated by a distance D when measured from the user-facing camera 110. The distance from any point on the head 100 that is visible to the user-facing camera 110 is called the depth. The depth of any point on the head 100 relative to any other point or feature on the head is called the relative depth DR.

The sensitivity of the user-facing cameras used in embodiments of the present invention need not be limited to any specific range of wavelengths but most commonly will be sensitive to near infra-red, NIR, light and/or visible, RGB, light. In some embodiments, RGB or intensity image information is provided directly from the camera image sensor, whereas in other embodiments, an event camera of the type disclosed in in Posch, C, Serrano-Gotarredona, T., Linares-Barranco, B., & Delbruck, T. "Retinomorphic event-based vision sensors: bioinspired cameras with spiking output", Proceedings of the IEEE, 102(10), 1470-1484, (2014), European Patent No. EP3440833, PCT Application WO2019/145516 and PCT Application WO2019/180033 from Prophesee can be employed and image information can be generated from event information provided by the camera, as disclosed in co-filed U.S. application Ser. No. 16/904, 122 entitled "Object Detection for Event Cameras", the disclosure of which is herein incorporated by reference. The user-facing camera will generally be in the form of a camera module comprising a housing for a lens and a sensor, the lens serving to focus light onto the sensor. The camera module may also have electronics to power the sensor and enable communication with the sensor. The camera module may also comprise electronics to process acquired images. The processing can be low level image signal processing, for example, gain control, exposure control, colour balance, denoise, etc. and/or it can involve more powerful processing for example, for computer vision. Typically, the cameras used in the DMS are configured to communicate data along a vehicle system bus (BUS), for example, a controller area network (CAN) bus. Data from other electronic components, such as additional cameras, may also be transmitted to the DMS along the BUS. In other embodiments, the DMS can be a separate system that can transfer and record data independently of the BUS.

In known systems, to convert relative depth measurements to absolute depth measurements, the measured size of anatomical features is compared to expected sizes. The expected sizes being obtained from reference data. The comparison of the measured size of anatomical features to expected sizes enables the calculation of the absolute distance of the anatomical features from the user-facing camera 110. Once the absolute depth of the anatomical features has been deduced, all other relative depth measurements can be converted from the absolute size of the anatomical features. In this way an absolute depth map of the facial image can be obtained. However, as explained in the background, this absolute depth conversion process introduces errors due to the variation in anatomical features between humans.

As shown in FIG. 1, the present invention addresses this problem by using a distance measuring sub-system 120 to scale relative depth measurement obtained from the user-facing camera 110 and obtain depth measurements. The distance measuring sub-system 120 in FIG. 1 determines the distance to the base plane BP. This measurement is then used to convert a relative depth map deduced from analysis of the data from the user-facing camera 110. In some embodiments, converting the relative depth map includes accounting for the pose of the head 100.

The relative depth maps that are obtained from the user-facing camera 110 are obtained by the above-mentioned methods. The error rates for such relative depth map is <1%. Embodiments of the invention use the interaction between the distance sensing sub-system 120 and the user-facing camera 110 of the DMS to provide a real-time facial depth map without adding the error associated with assumed anatomical feature size. The outcome is therefore an accurate absolute depth map that provides a depth estimate for each pixel in the acquired facial image of the user 10.

In some embodiments, the process to determine the depth of each pixel is as follows: acquiring 20 a facial image from the user-facing camera 110; determining 21 facial information from the acquired facial image; communicating 22 the determined information to the distance sensing sub-system 120; determining 23 a characteristic distance to at least a point on the head 100 o by performing distance measurement using the distance sensing sub-system 120; determining an relative depth map 24; and determining 25 an absolute depth map. The steps in this process is described in more detail below.

To determine 21 the facial information, data from the user-facing camera 110 is acquired 20 and analysed to identify a region that corresponds to the face. As the DMS aims to monitor and/or track the head 100 and upper body of the user, the DMS incorporates a real-time tracking ability. In some embodiments, the DMS determines facial information by applying a facial model to the data from the user-facing camera 110 to determine facial key points and analyse facial movements and behaviours. The facial information comprises information indicating the facial region of the user.

In some embodiments, the DMS is configured to track the eyes of the user to enable a real-time determination of the relative inter-pupillary distance. This determination enables an additional check on the distance measure provided by the distance measuring sub-system 120.

The DMS may also use known techniques to provide an accurate estimate of head-pose. Head-pose is based on the angular rotation of the head (yaw, pitch and roll) and it may be deduced from analysis of key facial features. The head-pose estimation may consider only relative depth measurements and thereby avoid errors associated with absolute distance assessment. Hence, an accurate head pose can be reliably estimated from the user-facing camera 110 of the DMS. In some embodiments, the knowledge of head pose is used to help improve the accuracy of a distance measurement sub-system 120.

Figure 3:
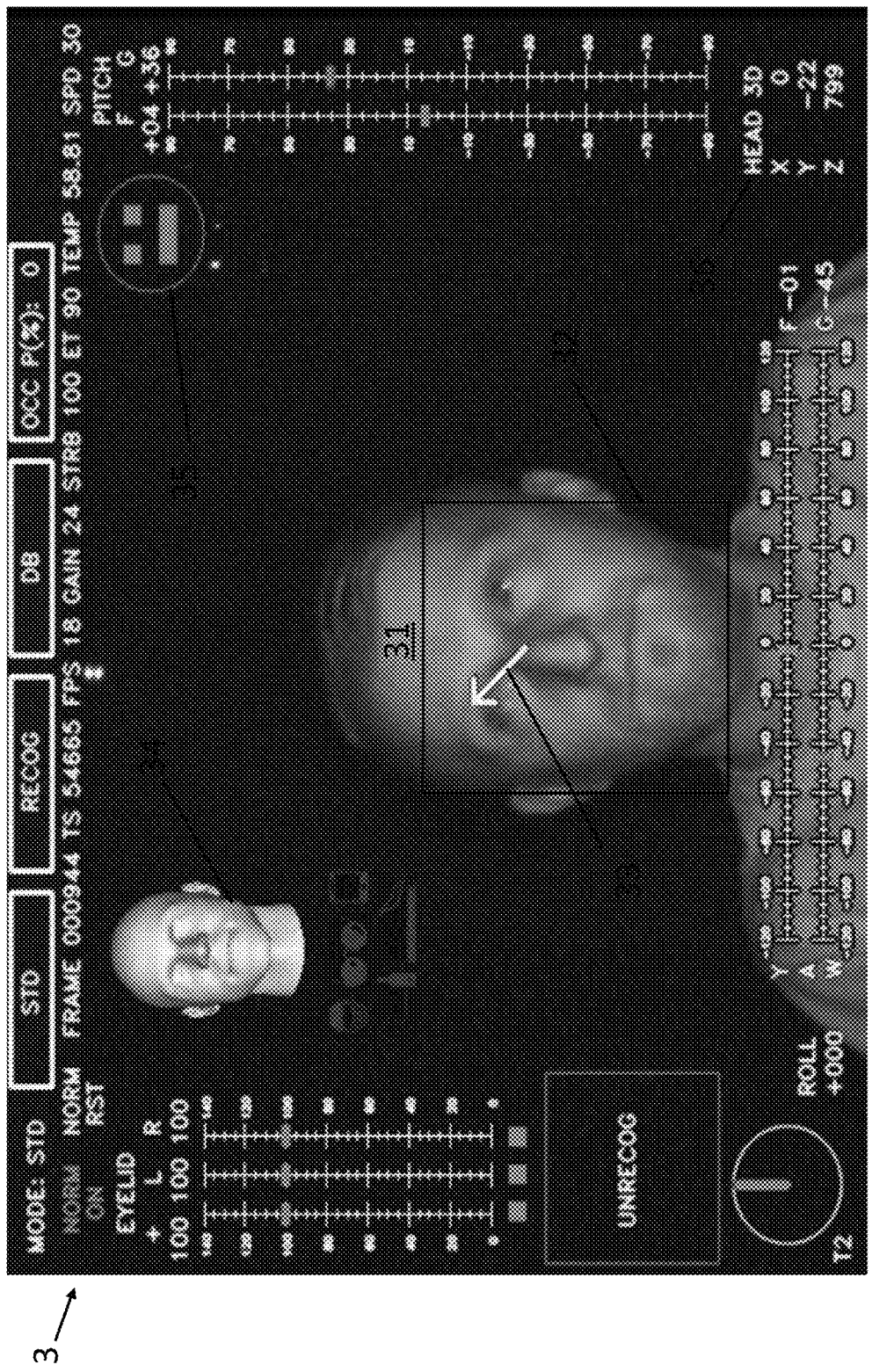
FIG. 3 shows a information acquired by the DMS by processing the image data from a user-facing camera.

The amount of facial information 3 that may be obtained from the user-facing camera 110 of the DMS can be extensive as shown in FIG. 3. In FIG. 3, the facial information 3 comprises an image 31 obtained from a user-facing camera 110 and various information that has been determined by the DMS from the image 31. The various information comprises: a facial region 32 of the image 31, which is indicated by a white rectangle; the eye-gaze direction 33, which is indicated by a white arrow; the head-pose of the head, which is indicated by the orientation of a head avatar 34 (straight-ahead); the facial expression or status of facial features (e.g. eye-blink status), which are indicated by an status indicator 35; and the translational position 36 of the head, which is given as a set of 3D coordinates. The DMS providing this facial information can also track facial features, such as eye location and the relative interpupillary distance, but this measurement is not displayed in FIG. 3. Other information which may be derived from a facial image can comprise landmarks corresponding to key facial features and knowledge of the location and relative location of these features within the facial region 32 can be used to determine the head pose, for example, as described in PCT Application WO2019/145578 (Ref: FN-630-PCT) the disclosure of which is herein incorporated by reference.

In some embodiments, some of the determined facial information 3 is useful to the distance measuring sub-system 120. In these embodiments, at least some facial information is selectively communicated to the distance measuring sub-system 120. The information communicated may vary between embodiments and according to the mechanism by which the distance measuring sub-system 120 measures distance. As an example, a distance measuring sub-system 120 using a laser-based distance measuring element may wish to avoid shining a laser into the eyes of the user and so knowledge of the location of the eyes of the user, within the sensing field of view, would be useful to such a distance measuring sub-system 120. In certain embodiments, the most significant angular region of the field-of-view of the facial region 310 is provided to the distance sensing sub-system 120, to improve the accuracy of the distance measurement by focusing the distance measurement on the most important regions of the field of view of the distance sensing sub-system 120.

In some embodiments, the information provided to the distance measuring sub-system 120 comprises the head-pose. The head-pose can be provided in various formats such as Eulerian or Quaternion format. Additional information about the horizontal and vertical translational positions of the head can also be provided. The provided information can also be mapped to any other reference frame as necessary. For example, the head-pose and head translation measurements can be used to define a field-of-view that can focus the distance measurement performed by the distance sensing sub-system 120 on the most appropriate part of its field of view.

An absolute distance measurement, i.e. a measurement of the depth D to at least a point of the head 100, may be determined by several methods using at least one distance measuring element. Several approaches are described below as exemplary embodiments but any method or system that provides an absolute distance measurement may be used.

Figure 4:
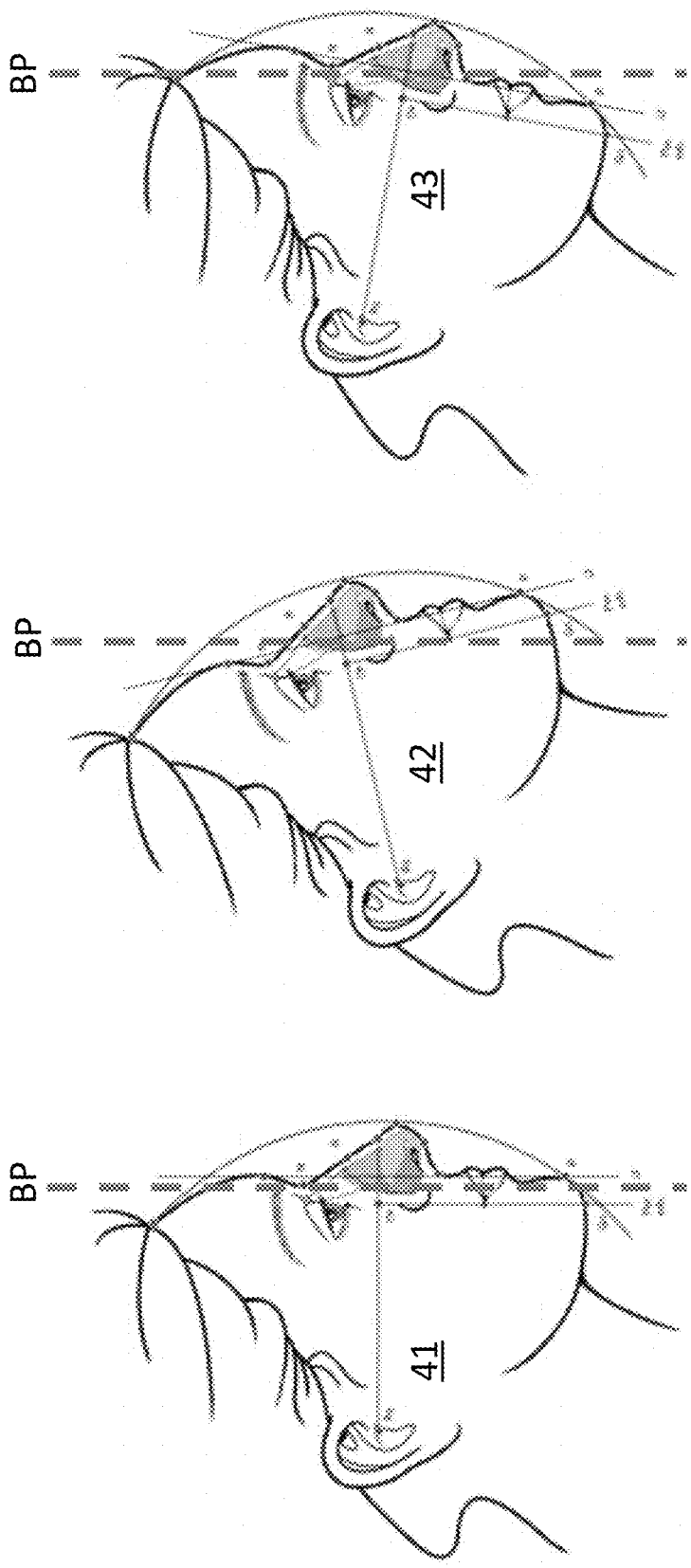
FIG. 4 shows the images of heads and their associated base planes and shows the variation in distance relative to the face as the head-pose changes.

In some embodiments, a short-range radar system measures this distance. In these cases, the distance measurement will be determined by the volumetric average of the face region. The averaging is illustrated in FIG. 4, showing that rather that measuring the distance between individual points to the distance measuring sub-system 120, the measured distance D provides an average distance to the base plane BP. From FIG. 4, the variation in the relative distance between the base plane BP and specific points on the face varies as the head-pose changes can be seen. For example, relative to a straight-ahead head-pose 42, the relative distance between the base plane BP and forehead increases when the head is tilted-up 41 and decreases when the head is tilted-down 43.

In some embodiments, a laser interferometer or LIDAR transceiver can make a series of point cloud measurements across the facial region and determine an average distance from the point cloud measurements. Optionally, with a laser-based measurement system, it may be possible to target a specific facial region such as the nose, cheeks, chin or forehead to obtain a more targeted set of distances in order to determine a baseline distance. The determined point cloud also comprises head-pose information. This head-pose information may be used to along with, or to verify, other head pose measurements such as head-pose information deduced from the user-facing camera 110 of the DMS. Ultrasonic or other remote distance measuring techniques may be employed in a similar manner to the radar-based or lidar-based examples.

In some embodiments, an additional offset user-facing camera may be used to provide a stereo view. From this stereo view, distances to features that are visible in both cameras may be deduced. For example, a second side-mounted or top-mounted wide-angle camera may be added to the DMS to provide a well-separated stereo camera system. The distance measuring sub-system 120 in this case uses information from both the additional offset user-facing camera and the user-facing camera 110 of the DMS. Configuring a DMS with cameras in this manner means known depth from disparity imaging methods may be used to give an accurate indication of the distance of any feature that is visible to both cameras.

These disclosed distance measuring methods may be combined or used in conjunction with other known distance measurement techniques.

Figure 5:
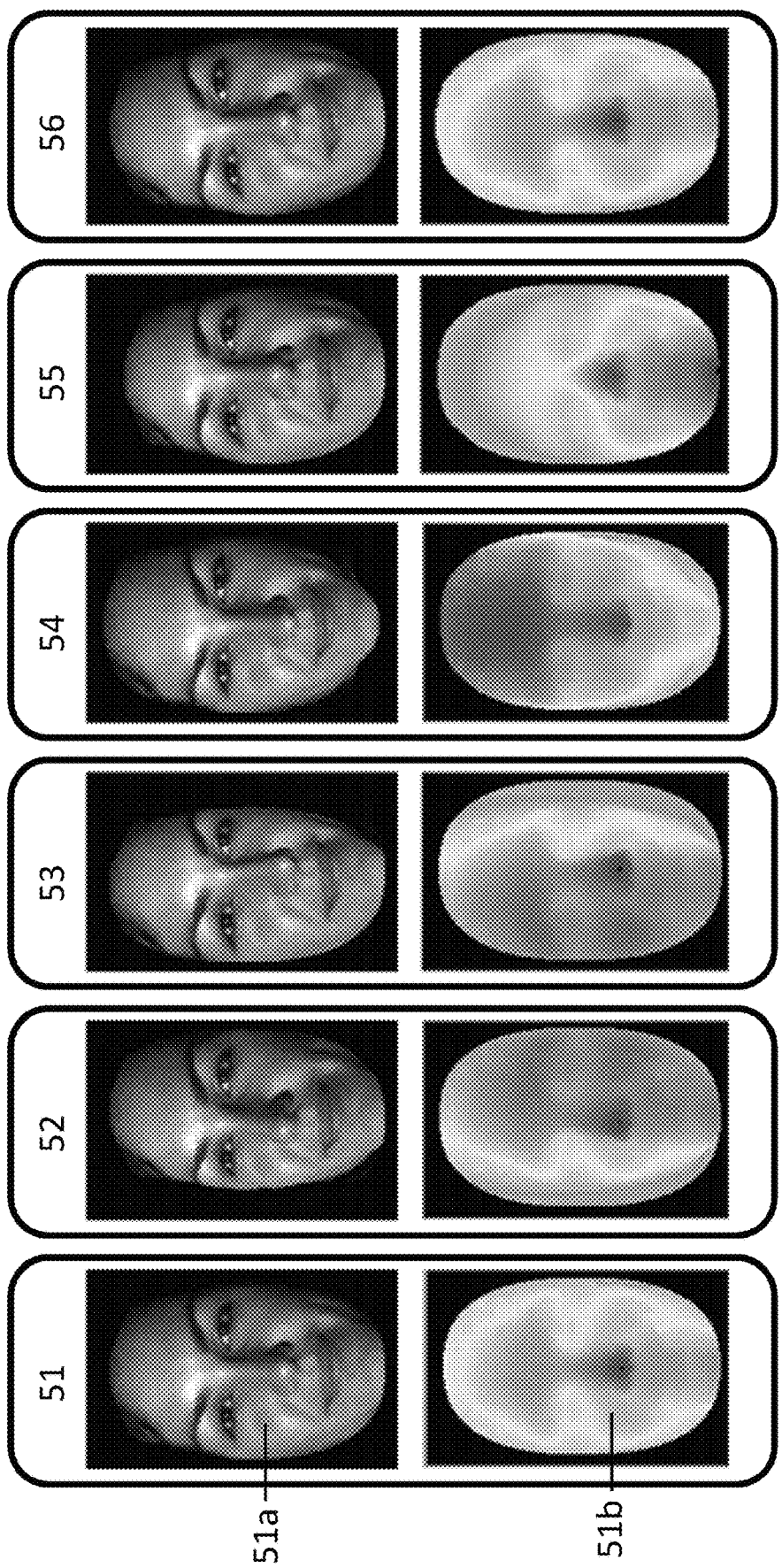
FIG. 5 shows exemplary facial images with their associated relative depth maps images below.

The imagery from the user-facing camera 110 of the DMS is used to determine relative depth maps, step 24. There are various known methods to produce the relative depth maps. For example a 3D reconstruction of a face/head model can be formed, as disclosed in the afore-mentioned M. Zollhöfer et al. article on "*State of the art on monocular 3D face reconstruction, tracking, and applications*" or by the methods disclosed in Y. Guo et al., "*CNN-Based Real-Time Dense Face Reconstruction with Inverse-Rendered Photo-Realistic Face Images*", IEEE Trans. Pattern Anal. Mach. Intell., 2019; L. Jiang et al., "*3D Face Reconstruction with Geometry Details from a Single Image*", IEEE Trans. Image Process., 2018; and P. Garrido et al., "*Reconstruction of personalized 3D face rigs from monocular video*", ACM Trans. Graph., 2016. Exemplary relative depth maps are shown in FIG. 5. In this figure, each relative depth map is shown in a column with the associated facial image. For example, a frontal relative depth map 51b is shown below the frontal facial image 51a used to determine the frontal relative depth map 51b. Looking at FIG. 5, from left to right, the head-poses associated with the columns of images are frontal 51, right-rotated 52, left-rotated 53, frontal-tilted-down, frontal-tilted-up, and frontal 56.

An absolute depth map is determined 25 by adding the depth information measured from the distance measuring sub-system 120 to the relative depth map. In one example, the DMS determines a head pose and receives a base plane BP distance measurement from the sensor sub-system 120. The DMS then determines a relative depth map corresponding to the imaged facial region. The relative depth map is then corrected to account for the head-pose and the base plane BP distance D is added to produce the absolute depth map. The determined absolute depth map provides the absolute distance from the user-facing camera 110 to any point on the facial region 31. As the location of the user-facing camera 110 in the vehicle compartment is known, from the absolute depth map measured from the user-facing camera 110, the position of the head and upper torso of the user in the vehicle can be determined.

Preferably, the relative depth map is determined directly from the imaged facial region along with a knowledge of the current head-pose to provide a real-time relative depth map using a computational module 6 comprising a convolutional neural network, CNN. Such a network can be executed on a processing platform of the types described in PCT Application WO2019/042703 (Ref: FN-618-PCT), the disclosure of which is incorporated herein by reference.

Figure 6:
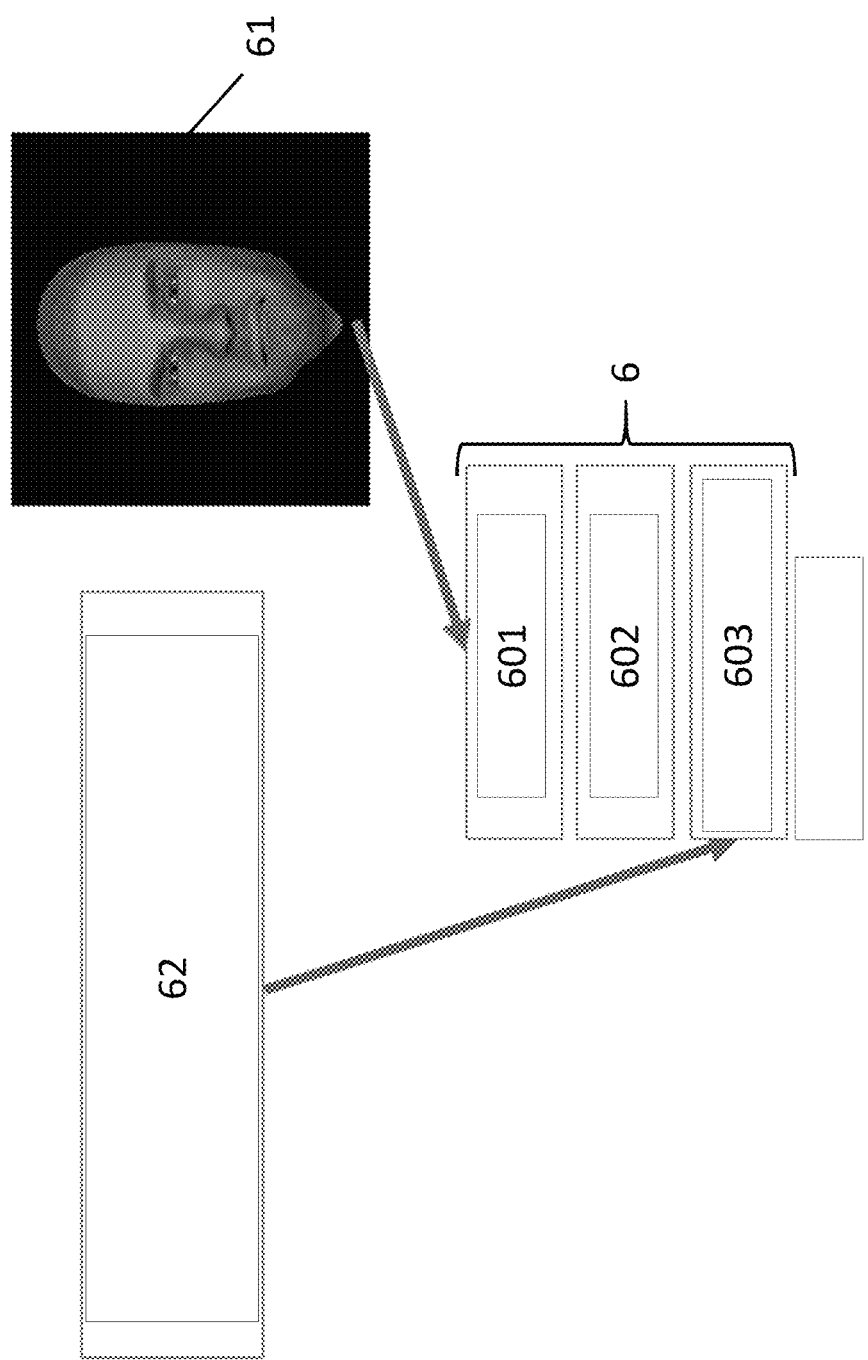
FIG. 6 shows a schematic of the components of an embodiment of the present invention that produces an absolute depth map.

An overview of such a computational module is shown in FIG. 6. In this figure, a facial image 61 is input to the first layer 601 of a CNN. The CNN processes the input via a series of intermediate layers 602. After the intermediate layers 602, an initial prediction of a relative depth map is formed. The processing then proceeds to a series of further layers 603. The further layers 603 receive additional input 62 comprising head-pose information and at least one absolute depth measurement e.g. the absolute depth of the centre of the nose. This additional input lets the further layers 603 refine the relative depth map and produce an accurate absolute depth map.

In some cases, the CNN comprises a Deep Neural Network, DNN. Such a CNN can be trained form a relative depth image of a facial image due. The training may be performed using either a large-scale dataset or in an unsupervised manner where acquiring the seed data is an exhaustive task. The user-facing camera 110 can be used to estimate the depth of the facial region by introducing a monocular depth estimation module. The CNN may therefore be trained on a large amount of data with truth labels captured by the distance measuring sub-system (supervised learning). The main issues with this training are the generalization of the trained model and depth scale ambiguity. Therefore, CNNs trained in this manner can achieve a good accuracy on a test set with a similar distribution as training sequence but they perform poorly in different use cases. However, this can be useful for specific training for some monitoring systems and in some limited use cases.

The relative depth estimation module acts as a complimentary step to the global information captured by the depth sensing component. This enables the scale ambiguity of the monocular depth estimation module to be rectified by a distance measuring sub-system e.g. a short-range radar system which measure the volumetric average of the face region.

Some embodiments use a radar-based distance measuring sub-system to produce a sparse array comprising a fixed number of points in its 3D coordinate system which can be transformed to camera's 3D coordinate system. Each radar point contains the depth, lateral velocity and longitudinal velocity information of a point on the object's surface. Using the camera's intrinsic matrix, each point can be projected into an image coordinate system. Each non-zero pixel in this space contains the depth and velocity of the radar features across the 3 channels. Radar-based distance measuring sub-systems provides a sparse set of measurement with highly accurate depth information. The depth information of these points is further propagated across the entire image to obtain a dense depth map. In this way, a dense depth map with correct scale is obtained by fusing the sparse depth information from the radar-based distance measuring sub-system with dense features from images from the user-facing camera.

Figure 7:
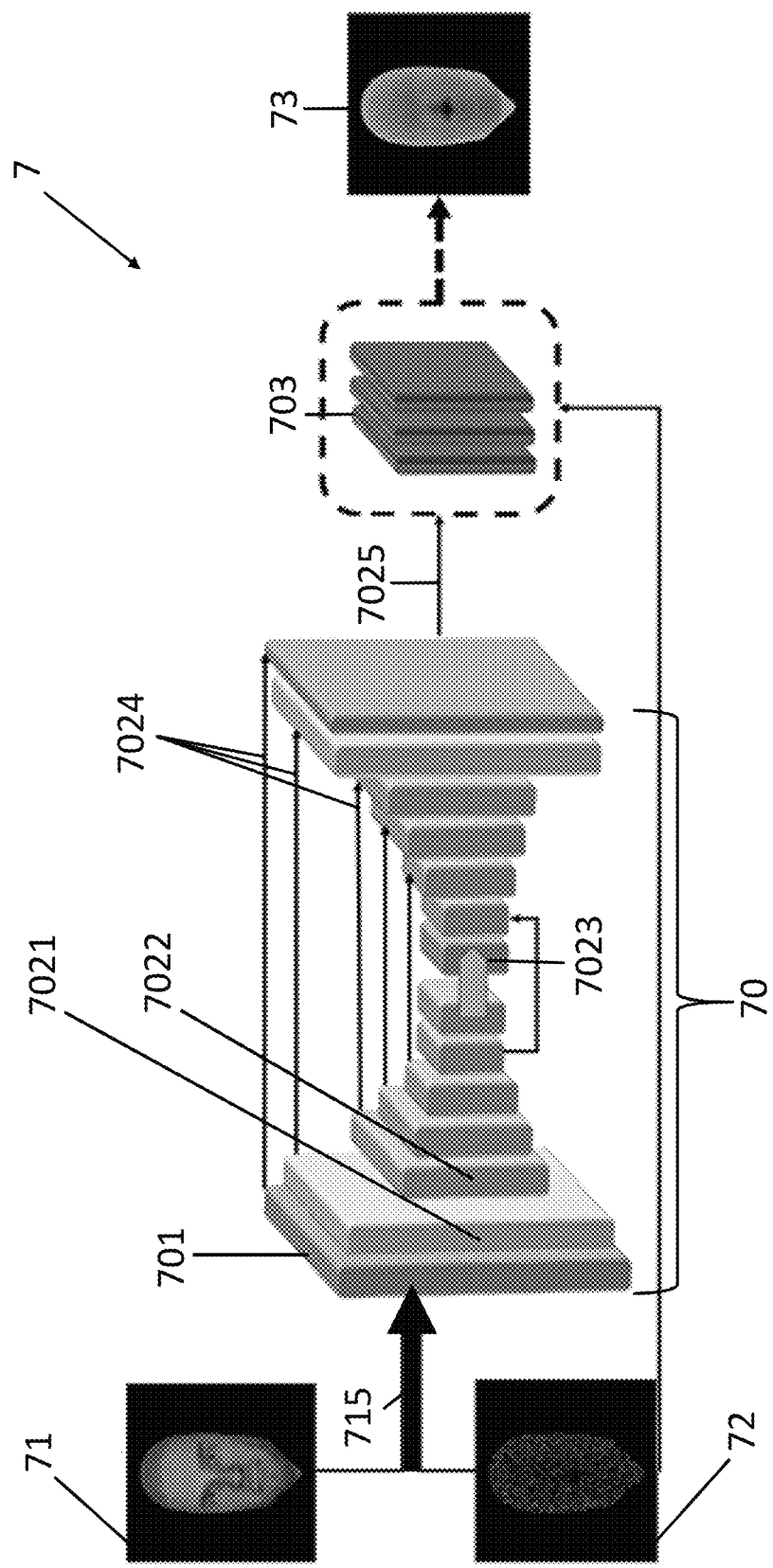
FIG. 7 shows a schematic image to demonstrate the pipeline of operation of an embodiment of the present invention.

FIG. 7 illustrates an example of a CNN based computational module 7 that operates according to the above teachings. The computational module 7 accepts as input, information from an image 71 acquired from the user-facing camera and from the sparse absolute depth map 72 captured using a radar-based distance measuring sub-system. The information is input is in the form of a 4D shape tensor 715. This input tensor 715 is further processed using an encoder-decoder structure 70 based on a residual neural nwork (ResNet-34), which is described in more detail in K. He et al., *"Deep residual learning for image recognition"*, in *Proceedings of the IEEE conference on computer vision and pattern recognition*, 2016, page 770-778. In brief, in the encoding process, the inputs are first input to a convolution layer 701 with a stride of length 2 and having batch normalization and a rectified linear unit activation function. Encoding continues through a max pooling layer 7021 with fractional strided convolution, through a series of ResNet-34 Blocks 7022, and through an atrous spatial pyramid, ASPP, layer 7023. The decoding process then occurs through corresponding decoding layers. As is typical in residual neural networks, there are a series of skip connectors 7024. The output of the ResNet-34 encoder-decoder structure 70 is an initial prediction 7025 of the depth map. This initial prediction 7025 is then passed with the sparse absolute depth map 72 through a guided filtering module 703 that performs depth scale correction. The final output 73 of the computational module 7 is a dense absolute depth map of the facial region.

Different inputs to the computational module 7 may be used in other embodiments. The different inputs will correspond to the output format of the distance measuring sub-system 120. For example, in FIG. 7, the input is the image 71 and the sparse absolute depth map 72 corresponding to a short-range radar-based distance measuring sub system. For the case of a stereo-camera-based distance measuring sub-system, the inputs could be the image 71 and an absolute disparity map formed by comparison of the image from of the images from the stereo cameras. In this case, input could be concatenated with the input or to an intermediate layer.

For distance measuring sub-system 120 providing a single absolute distance measurement, the single distance measurement can be input by duplicating the measurement value in a matrix equal to the size of the input image 71. Again, this can be concatenated with the input or added to an intermediate layer.

All inputs supply a dense image and at least one value to allow rescaling of the depth maps that are processed. In all cases, regardless of the form of the input, the system provides a real-time dense absolute depth map.

The above processes and systems provide several important differences compared to the case where the absolute distance measurement or an image of absolute distance measurements is not available. For example, without such absolute depth information, it is not possible to resolve the depth ambiguity issue associated with monocular methods. Without this information, the position of the camera must be calibrated by manually measuring the distance to the object to obtain the depth scale. Monocular methods of depth estimation also tend to process the entire image though it is very unlikely that all pixels contain valuable information in this regard. Having access to the depth information can therefore significantly decrease the estimation error by helping to identify outliers that can be ignored. Efficiency of processing can therefore be significantly increased by processing only regions with depth values that are likely to be valid. Some monocular methods of depth estimation try to achieve a high structural accuracy by introducing different imaging modalities in network structure which can result in a high computational requirement. However, the proposed framework uses the information or partial structure provided by the depth information to achieve a stable geometrical structure in the depth map.

In some embodiments, a facial expression classifier may also be provided so the relative depth image can be improved by adjusting it to match the current facial expression.

In some embodiments, relative depth maps may be pre-determined and stored. A range of relative depth maps may be stored for different head-poses. Intermediate relative depth maps may be extrapolated from two or more of the closest depth maps to the current face pose. Stored depth maps may also be adjusted using affine transformations to improve registration with the determined facial region of the user. By using stored relative depth maps, at least as an initial estimate, the process to determine a relative depth map can be significantly sped up and the final depth map can be smoother and more representative.

In some embodiments, the DMS may be configured to gather and process facial images of a particular user to build a more accurate and personalized 3D geometry, and relative depth map, for that person. This improved depth map may be stored and used to modify the real-time depth maps. In some embodiments, these refined 3D geometries and depth maps may be used to re-train or adapt, through transfer learning or otherwise, neural networks that provide a real-time relative depth map.

The invention claimed is:

1. A method for determining an absolute depth map to monitor the location and pose of a head (100) being imaged by a camera, the method comprising:
   acquiring (20) an image from the camera (110) including a head with a facial region;
   determining (23) a distance from the camera (110) to a base plane, the base plane being a plane located at an average distance from the camera (110) to the facial region, the average distance being based at least on one distance from the camera (110) to a facial feature of the facial region using a distance measuring sub-system (120);
   determining (24) a relative depth map of facial features within the facial region with respect to the base plane; and
   adding (25) the distance from the camera to the base plane to the relative depth map to form an absolute depth map for the facial region.

2. The method of claim 1, wherein the at least one distance from the camera (110) to a facial feature of the facial region comprises an array of distance measurements for a plurality of locations within the facial region, and
   wherein combining the relative depth map with the at least one distance to form an absolute depth map comprises:
   determining a head-pose from the array of distance measurements; and
   refining the relative depth map using the determined head-pose.

3. The method of claim 1, wherein the distance measuring sub-system (120) comprises a stereo camera comprising the camera (110) and an additional camera offset from the camera (110) and with a substantially overlapping field of view; and
   wherein the distance to at least one feature imaged in the camera (110) and the additional camera is determined from a disparity in the at least one feature when imaged in the camera (110) relative to the additional camera.

4. The method of claim 1, wherein the distance measuring sub-system (120) comprises a radar system and the at least one distance comprises a point cloud of distance measurements.

5. The method of claim 1, wherein at least some of the determined facial information is communicated to the distance measuring sub-system (120), and the method comprises the distance measuring sub-system (120) adjusting an operational parameter according to the communicated information.

6. The method of claim 5, wherein the distance measuring sub-system (120) comprises a laser transceiver and the method comprises using the communication facial information to configure the distance measuring sub-system to direct a laser source into a region of the face being tracked that does not comprise an eye.

7. The method of claim 1, further comprising:
   determining an inter-pupillary distance from said acquired image, and
   confirming the at least one distance by comparing the determined inter-pupillary distance to expected inter-pupillary distance values for a head located at the at least one distance.

8. A system for determining an absolute depth map to monitor the location and pose of a head (100), the system comprising:
   a camera (110) configured to acquire an image including a head with a facial region;
   a distance measuring sub-system (120) for measuring the distance from a point on the head (100) to the camera (110); and
   a computational module (6) configured to perform the steps of claim 1.

9. The system of claim 8, wherein the computational module (7) comprises:
   a residual neural network (70) with an encoder-decoder structure with skip connections (7024) that is configured to produce an initial relative depth map (7025) in response to receiving an image (71) from the camera (110) and the at least one distance; and
   a guided filter block (703) configured to refine the initial relative depth map (7025) with the at least one distance to form the absolute depth map (73).

10. The system of claim 9, wherein the computational module (7) has been trained by using the distance measuring sub-system (120) to provide truth labels for depth measurements produced from analysis of the camera (110).

11. The system of claim 8, wherein the computational module (6) is further configured to load a stored depth map to provide an initial estimate of the depth map.

12. The system of claim 11, wherein the system is configured to gather and process facial images of a particular user to refine the stored depth map.

13. The system of claim 9, wherein the computational module (7) comprises a facial expression classifier and the computational module is configured to adjust the initial relative depth map (7025) to account for the current facial expression.

14. A driver monitoring system for a vehicle comprising the system of claim 8.

\* \* \* \* \*